(12) United States Patent
Matsuoka

(10) Patent No.: US 6,272,261 B1
(45) Date of Patent: Aug. 7, 2001

(54) IMAGE PROCESSING DEVICE

(75) Inventor: Teruhiko Matsuoka, Sakura (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/238,847

(22) Filed: Jan. 28, 1999

(30) Foreign Application Priority Data

Jan. 28, 1998 (JP) ................................................ 10-016039

(51) Int. Cl.$^7$ ..................................................... G06K 9/36
(52) U.S. Cl. ........................... 382/276; 382/190; 382/300
(58) Field of Search .................................... 382/148, 155, 382/156, 173, 176, 198, 199, 205, 210, 237, 233, 250, 254, 256, 260, 263, 264, 266, 276, 279, 190, 298, 299, 300; 706/14, 15, 20, 45; 358/428, 525; 345/132

(56) References Cited

U.S. PATENT DOCUMENTS

| 5,381,183 | * | 1/1995 | Ishizuka et al. | 348/458 |
| 5,454,052 | * | 9/1995 | Kojima | 382/233 |
| 5,682,442 | * | 10/1997 | Johnston et al. | 382/239 |
| 5,754,710 | * | 5/1998 | Sekine et al. | 382/300 |
| 5,761,383 | * | 6/1998 | Engel et al. | 706/14 |
| 5,867,593 | * | 2/1999 | Fukuda et al. | 382/176 |
| 5,886,797 | * | 3/1999 | Shimura | 358/455 |
| 5,903,482 | * | 5/1999 | Iwamura et al. | 364/724.1 |
| 5,933,537 | * | 8/1999 | Hajjahmad et al. | 382/250 |
| 6,075,926 | * | 6/2000 | Atkins et al. | 358/1.2 |

FOREIGN PATENT DOCUMENTS 5-135165    6/1993   (JP).

* cited by examiner

*Primary Examiner*—Leo Boudreau
*Assistant Examiner*—Kanji Patel
(74) *Attorney, Agent, or Firm*—David G. Conlin; William J. Daley, Jr.; Dike, Bronstein, Roberts & Cushman, Intellectual Property Practice Group (57) ABSTRACT

The present invention provides an image processing device capable of performing high-resolution conversion, enlargement processing, etc. which, even with images including both text images and photographic images, satisfies both sharpness of text areas and smoothness of photograph areas. The image processing device according to the present invention performs frequency conversion, using a frequency conversion device, of partial images which are the objects of processing, resulting in a matrix of frequency-converted coefficients; divides into a plurality of domains, using a plurality of patterns, the matrix of frequency-converted coefficients; and quantifies each such domain by finding a mean value of the coefficients of that domain as a feature quantity for that domain. The mean coefficient value of each domain is inputted into a conversion filter selecting device, where a hierarchical neural network calculates and outputs the suitability of each conversion filter for the partial image in question, and the conversion filter selecting device selects the conversion filter with the highest suitability. Then an interpolation processing device performs interpolation processing of each partial image using the conversion filter most suited thereto.

14 Claims, 9 Drawing Sheets

FIG. 2(a)

| 239 | 255 | 249 | 232 |
|-----|-----|-----|-----|
| 246 | 255 | 244 | 214 |
| 255 | 255 | 235 | 201 |
| 255 | 246 | 219 | 183 |

NON-EDGE IMAGE

FIG. 2(b)

| 255 | 255 | 255 | 55  |
|-----|-----|-----|-----|
| 136 | 255 | 255 | 255 |
| 4   | 122 | 255 | 255 |
| 2   | 1   | 118 | 255 |

DIAGONAL EDGE IMAGE

FIG. 2(c)

| 10 | 255 | 255 | 255 |
|----|-----|-----|-----|
| 22 | 255 | 255 | 255 |
| 10 | 255 | 255 | 255 |
| 12 | 255 | 255 | 255 |

VERTICAL EDGE IMAGE

| 4096 | 4096 | 4096 | 4096 |
|------|------|------|------|
| 5352 | 2217 | -2217 | -5352 |
| 4096 | -4096 | -4096 | 4096 |
| 2217 | -5352 | 5352 | -2217 |

MATRIX OF RESULTS OF COMPUTATION OF
$\cos\{(2m+1)u\pi/8\}$ and
$\cos\{(2n+1)v\pi/8\}$
WITH BASE LENGTH OF 4

FIG.5(a)

| 4 3 4 | 6 3 | −3 3 | 2 |
|---|---|---|---|
| 2 5 | −3 6 | −3 | −3 |
| −7 | −2 | 3 | −1 |
| 5 | −2 | 1 | −1 | f1=41   f2=9   f3=2   f4=8   f5=8   f6=20

FIG.5(b)

| 2 2 1 | −2 3 7 | −2 5 | −2 |
|---|---|---|---|
| 2 4 6 | 1 6 2 | −4 5 | −1 9 |
| −3 5 | 4 0 | 9 4 | 1 1 |
| 1 | −2 7 | −1 8 | 3 1 | f1=215   f2=47   f3=15   f4=69   f5=63   f6=65

FIG.5(c)

| 2 6 7 | −3 1 5 | −2 4 1 | −1 3 1 |
|---|---|---|---|
| 1 | 2 | 1 | 1 |
| −2 | −3 | −2 | −1 |
| −4 | −5 | −4 | −2 | f1=106   f2=49   f3=21   f4=3   f5=2   f6=137

···PIXEL OF ORIGINAL IMAGE

FIG.9(a)

| 239 | 247 | 255 | 252 | 249 | 241 | 232 | |
|---|---|---|---|---|---|---|---|
| 243 | 249 | 255 | 251 | 247 | 235 | 223 | |
| 246 | 251 | 255 | 250 | 244 | 229 | 214 | |
| 251 | 253 | 255 | 248 | 240 | 224 | 208 | |
| 255 | 255 | 255 | 245 | 235 | 218 | 201 | |
| 255 | 253 | 251 | 239 | 227 | 210 | 192 | |
| 255 | 251 | 246 | 233 | 219 | 201 | 183 | |
| | | | | | | | |

···PIXEL OF ORIGINAL IMAGE

FIG.9(b)

| 255 | 255 | 255 | 255 | 255 | 255 | 255 | |
|---|---|---|---|---|---|---|---|
| 212 | 243 | 255 | 255 | 255 | 252 | 255 | |
| 136 | 195 | 255 | 255 | 255 | 255 | 255 | |
| 55 | 120 | 203 | 255 | 255 | 255 | 255 | |
| 4 | 46 | 122 | 203 | 255 | 255 | 255 | |
| 0 | 0 | 44 | 114 | 186 | 238 | 255 | |
| 2 | 0 | 1 | 42 | 118 | 201 | 255 | |
| | | | | | | | |

···PIXEL OF ORIGINAL IMAGE

FIG.9(c)

| 10 | 132 | 255 | 255 | 255 | 255 | 255 | |
|---|---|---|---|---|---|---|---|
| 16 | 135 | 255 | 255 | 255 | 252 | 255 | |
| 22 | 138 | 255 | 255 | 255 | 255 | 255 | |
| 16 | 135 | 255 | 255 | 255 | 255 | 255 | |
| 10 | 132 | 255 | 255 | 255 | 255 | 255 | |
| 11 | 133 | 255 | 255 | 255 | 255 | 255 | |
| 12 | 133 | 255 | 255 | 255 | 255 | 255 | |
| | | | | | | | |

IMAGE PROCESSING DEVICE

FIELD OF THE INVENTION

The present invention relates to an image processing device which performs high-resolution conversion, enlargement processing, etc. of a gray-scale image.

BACKGROUND OF THE INVENTION

When performing high-resolution conversion, enlargement processing, etc. of a gray-scale image inputted by, for example, a scanner or digital camera, data for a given pixel to be interpolated is determined based on the results of sum-of-products computation using data of pixels in the vicinity of the pixel to be interpolated. Examples of this type of interpolation computing method are (1) nearest neighbor interpolation, in which data of pixels nearest in position to the pixel to be interpolated are used as the data for the pixel to be interpolated, (2) bi-linear interpolation, in which sum-of-products computation is performed using data of surrounding pixels, and (3) cubic convolution interpolation, in which convoluted sum-of-products computation is performed using data of surrounding pixels.

Each of the foregoing interpolation computing methods has strengths and weaknesses. With nearest neighbor interpolation, processing time is short, but diagonal lines, for example, are made uneven (jagged), and thus image quality is poor. With bi-linear interpolation, on the other hand, processing time is comparatively short, and interpolation goes well in areas of gradual density change, but in areas of sharp density change, such as edges, interpolation makes the edges fuzzy. Again, with cubic convolution interpolation, there is some worsening of image quality, but smooth images can be obtained, and edges are interpolated without becoming fuzzy. However, processing time is comparatively long, and in cases of noise, such as a small dot in an area of gradual density change, the noise is emphasized, thus impairing image quality.

When performing high-resolution conversion, enlargement processing, etc. of, for example, an image including both text images and photographic images, a single one of the foregoing interpolation computing methods used alone is not able to ensure both resolution of the text areas and smoothness of the photograph areas.

In answer to this, methods have been proposed in which edge areas and non-edge areas of partial domains are determined based on density change therein, and different interpolation methods are used in different domains as needed. For example, Japanese Unexamined Patent Publication No. 5-135165/1993 (Tokukaihei 5-135165) discloses an image processing device which, within a local domain including a given pixel and surrounding pixels, finds maximum and minimum density values, subtracts the minimum value from the maximum value to obtain a maximum density difference of the local domain, and uses the maximum density difference to determine whether the local domain is a text domain or a photograph domain.

However, with the foregoing method, erroneous determinations may be made, for example, when noise in a local domain causes a large maximum density difference value to be obtained for a local region whose actual change in density is small. Further, in methods like the foregoing, which use density change in extracting edges, depending on the way edges are extracted, the pattern of density change in local domains may vary with change of direction of the edge. For this reason, when an image is, for example, rotated, different extracting conditions are necessary, thus complicating condition formulae, and increasing processing time.

SUMMARY OF THE INVENTION

It is an object of the present invention to provide an image processing device capable of performing high-resolution conversion, enlargement processing, etc. which, even with images including both text images and photographic images, satisfies both sharpness of text areas and smoothness of photograph areas.

In order to attain the foregoing object, an image processing device according to the present invention is an image processing device which divides into partial images a gray-scale image to be processed, and performs high-resolution conversion, enlargement processing, etc. of the partial images, and comprises: frequency conversion means, which perform frequency conversion processing of a partial image; feature quantity extracting means, which, based on output from the frequency conversion means, extract feature quantities from the partial image; and conversion filter selecting means, which, based on output from the feature quantity extracting means, select a conversion filter for performing high-resolution conversion, enlargement processing, etc. of the partial image.

In the foregoing structure, the frequency conversion means perform frequency conversion processing of a partial image; the feature quantity extracting means extract feature quantities from the partial image; and the conversion filter selecting means, based on output from the feature quantity extracting means, select a conversion filter. Thus, interpolation can be performed which is suited to the features of each partial image. To explain in detail, since the features of each partial image are determined based on the result of frequency conversion processing, even when there is noise in a partial image, a conversion filter suited to the partial image can be selected without influence from the noise. Accordingly, with images with edges, such as text images, interpolation can be performed so as to preserve those edges, and with images with smooth density change, such as photographic images, interpolation can be performed so as to maintain that smoothness. Consequently, high-resolution converted images can be obtained with little impairment of image quality.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention with reference to FIGS. 1 through 9(c).

Figure 1:
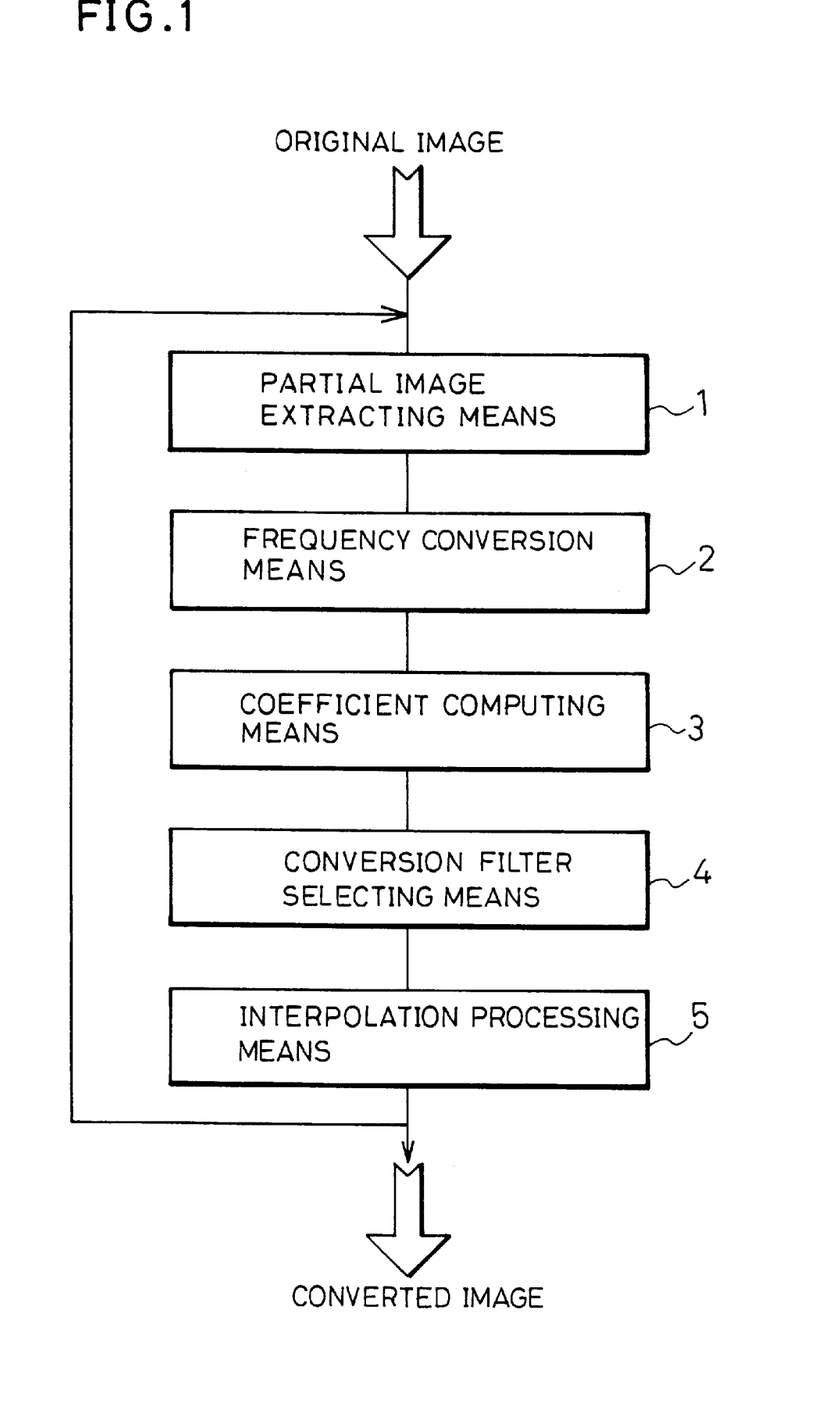
FIG. 1 is a block diagram schematically showing the structure of an image processing device according to an embodiment of the present invention.
Figure 2:
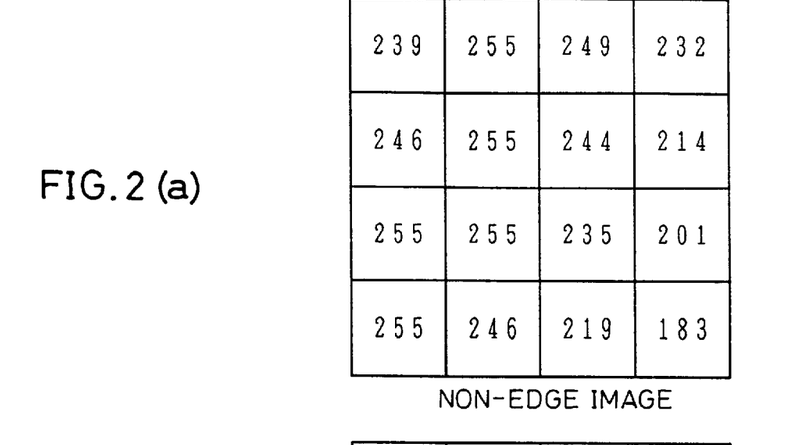
FIGS. 2(a) through 2(c) are explanatory drawings showing examples of three partial images of 4×4 pixels each.

FIG. 1 is a block diagram schematically showing the structure of an image processing device according to an embodiment of the present invention. The present image processing device includes partial image extracting means 1, frequency conversion means 2, coefficient computing means 3 (feature quantity extracting means), conversion filter selecting means 4, and interpolation processing means 5.

From the data of a gray-scale original image inputted through an image input device such as an image scanner or digital camera, or gray-scale original image data previously inputted and stored in a memory device such as a hard disk or memory, the partial image extracting means 1 read into memory data of partial images which are the objects of processing.

The frequency conversion means 2 perform frequency conversion of each partial image extracted by the partial image extracting means 1, using a frequency conversion matrix (such as DCT (Discrete Cosine Transform)) of a size equal to the partial image. The frequency conversion means 2 then temporarily store in a memory, etc. values of frequency domains into which the extracted partial image has been converted, as coefficients in a frequency-converted matrix.

The coefficient computing means 3 perform the following operations. First, the matrix of frequency-converted coefficients obtained by the frequency conversion means 2 is divided into, for example, three domains from low frequency to high frequency, and three wedge-shaped domains of 300 each, radiating from the upper left-hand corner of the matrix. Then, in each of these six domains, a mean value of the absolute values of the coefficients in that domain is calculated and temporarily stored as the mean coefficient value for that domain.

The conversion filter selecting means 4 perform the following operations. First, the mean coefficient values for the six domains above, calculated by the coefficient computing means 3, are inputted into a hierarchical neural network. In the present embodiment, as the hierarchical neural network, a 3-tier Perceptron with 6 inputs and 3 outputs is used, which, due to previous learning from experimental data, is capable of selecting the filter which uses the optimum interpolation computing method. The hierarchical neural network, based on the six inputted data, determines the features of the partial image, and outputs the suitability of each of three filters. Then the filter with the greatest suitability is selected as the filter for that partial image. In the present embodiment, the three filters used are a filter which uses bi-linear interpolation, a filter which uses cubic convolution interpolation, and a filter which uses a sigmoid function.

The interpolation processing means 5, using the filter selected by the conversion filter selecting means 4, performs interpolation processing of the partial image for high-resolution conversion, enlargement processing, etc., and stores the interpolated data in a memory, etc.

Next, the flow of processing in the image processing device according to the present embodiment will be explained in detail. The following will explain processing of partial images made up of 4×4 pixels, having 256 gray shades, like the three characteristic examples shown in FIGS. 2(a) through 2(c). FIG. 2(a) shows a non-edge image, FIG. 2(b) a diagonal edge image, and FIG. 2(c) a vertical edge image. Further, the following will explain interpolation processing for resolution conversion to 2 times the initial resolution.

First, from a previously inputted original image, the partial image extracting means 1 read image data of 4×4 pixels, like those shown in FIGS. 2(a) through 2(c), as image data of one partial image. This data is temporarily stored in a buffer, and is sent to the frequency conversion means 2.

Figure 3:
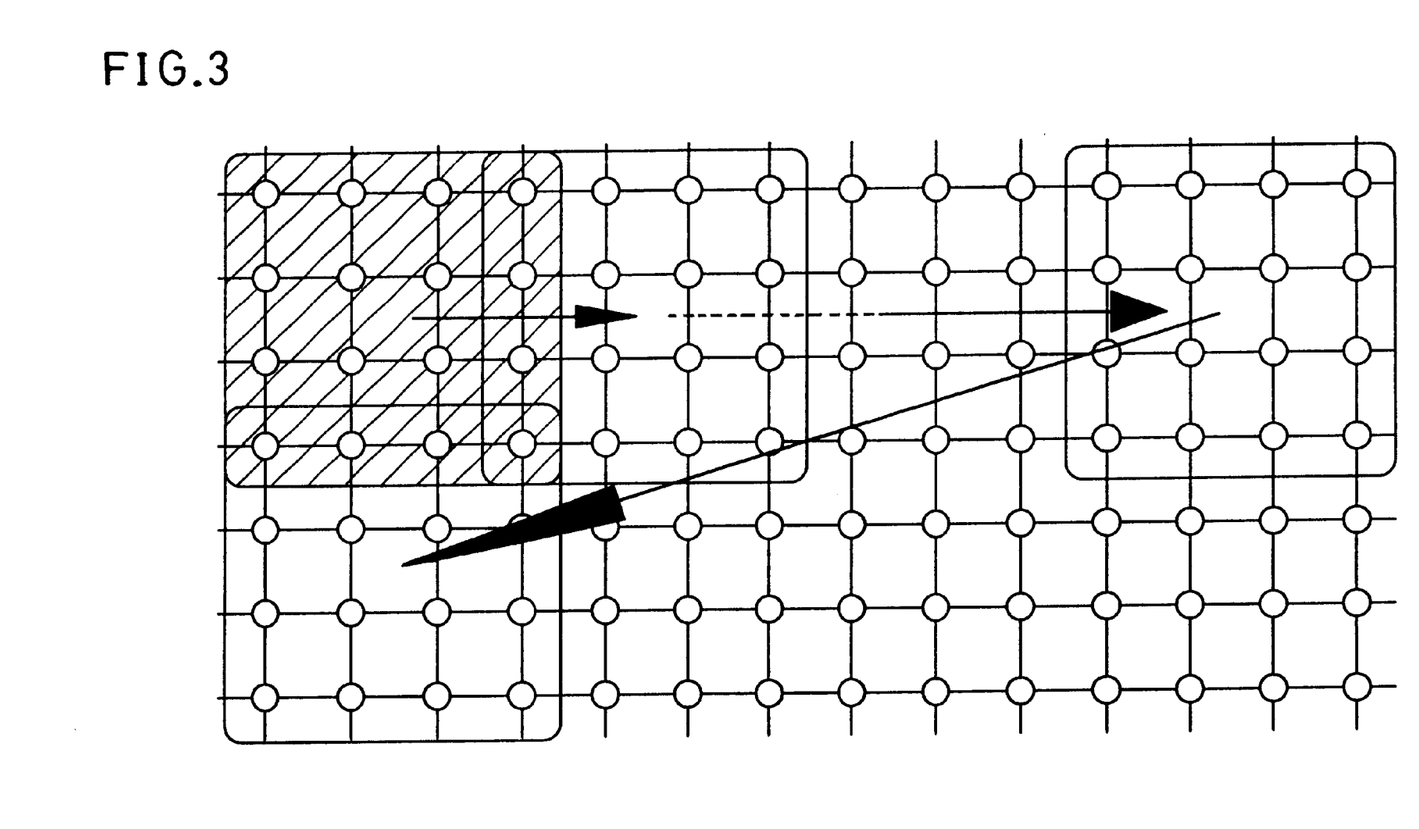
FIG. 3 is an explanatory drawing showing a method of consecutively reading partial images of 4×4 pixels each.

After the processing to be discussed below is finished, and conversion of the image data of the partial image stored in the buffer has been completed, the partial image extracting means 1 read image data of the next 4×4 pixels in the horizontal direction (to the right) as image data of the next partial image. At this time, as shown in FIG. 3, image data is read so that the 4 pixels in the right-most column of the preceding 4×4 pixels are the 4 pixels in the left-most column of the following 4×4 pixels. When successive reading of the image data of each 4×4 pixels in the horizontal direction reaches the column of pixels at the right edge of the original image, reading returns to the left edge of the original image and again begins reading toward the right, and at this time, image data is read so that the 4 pixels in the lowest row of the 4×4 pixels above are the 4 pixels of the highest row of the 4×4 pixels below. In this way, block distortion can be eliminated.

The frequency conversion means 2 perform frequency conversion of the image data for each partial image, sent from the partial image extracting means 1, using DCT with a base length of 4.

Next, DCT will be explained in brief. DCT is an acronym for Discrete Cosine Transform. The two-dimensional DCT used in image processing is shown by the following formula.

$$X(u, v) = \sum_{m=0}^{N-1} \sum_{n=0}^{N-1} x(m, n) a_{uv}(m, n)$$

Here, $$a_{uv}(m, n) = a(u, m) a(v, n)$$
$$= (2/N) C(u) C(v) \cos((2m+1)u\pi/2N) \cos((2n+1)v\pi/2N)$$

Here, x(m,n) is image data, $a_{uv}(m,n)$ is the base for two-dimensional DCT, N is the length of the base, and X(u,v) is a DCT coefficient. Further, C(u) and C(v) are constants, and have the following values.

$$C(p) = 1/\sqrt{2} \ (p=0), \ C(p) = 1 \ (p \neq 0)$$

Further, in X(u,v), X(0,0) is referred to as the DC coefficient, and all other X(u,v) are referred to as AC coefficients.

Since the two-dimensional DCT used in the present embodiment has a matrix size of 4 (N=2²), high-speed computing algorithms can be applied; specifically, as in the following formulae.

$$x'(u, n) = C(n) \sum_{m=0}^{3} x(m, n) \cos\{(2m + 1)u\pi / 8\} \quad u, n = 0, 1, 2, 3$$

$$X(u, v) = (1/2)C(v) \sum_{n=0}^{3} x'(u, n) \cos\{(2n + 1)v\pi / 8\} \quad u, v = 0, 1, 2, 3$$

Figure 4:
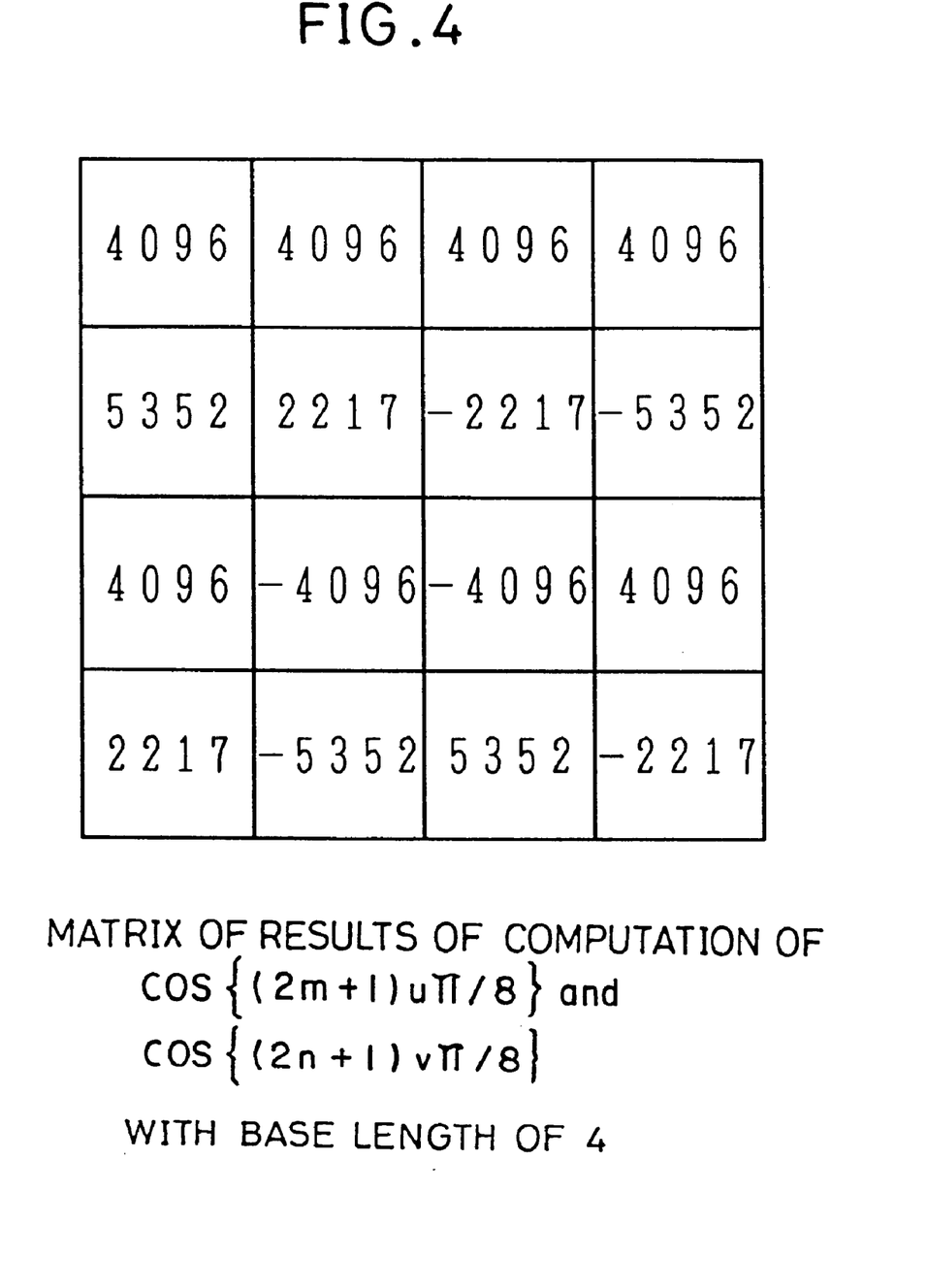
FIG. 4 is an explanatory drawing showing a matrix, used in frequency conversion computation, of results of computation of $\cos\{(2m+1)u\pi/8\}$ and $\cos\{(2n+1)v\pi/8\}$ with a base length of 4.

Further, for the purposes of high-speed computation, the values of the foregoing cos {(2m+1)uπ/8} and cos {(2n+1)vπ/8} are calculated in advance and stored, as a matrix like that shown in FIG. 4, in a memory, etc. For the purposes of high-speed computation processing, the values in the matrix in FIG. 4 are shown as fixed decimal point values, obtained by shift computing the typical floating decimal point values by 12 bits to the left.

Figure 5A:
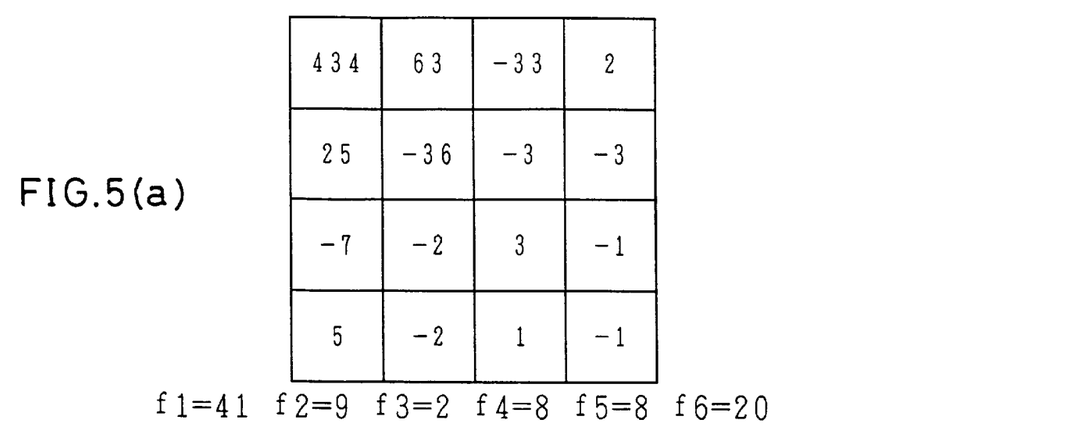
FIGS. 5(a) through 5(c) are explanatory drawings showing, for three partial images, matrices of frequency-converted coefficients and mean coefficient values for each domain thereof.
Figure 5B:
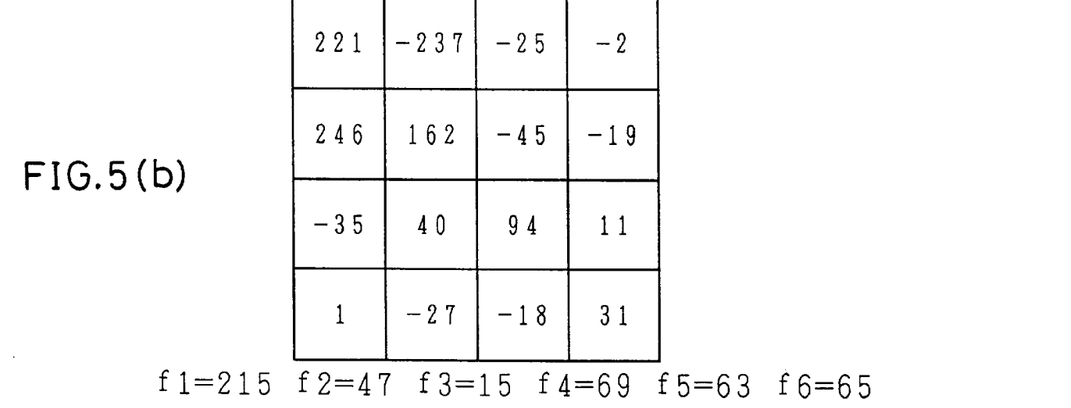
Figure 5C:
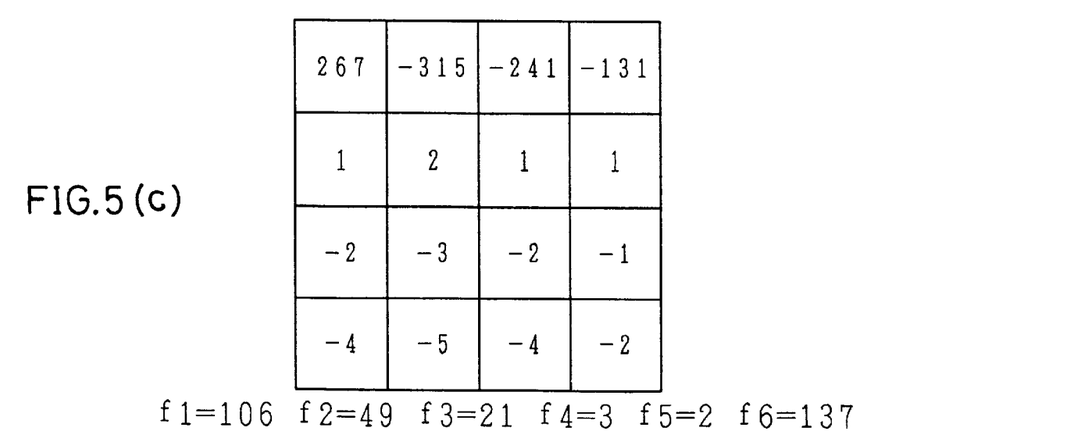

Then, using the foregoing high-speed computation algorithms, the image data of each partial image is frequency converted, as shown in FIGS. 5(a) through 5(c), and temporarily stored, as a matrix of frequency-converted coefficients, in a buffer. Incidentally, FIG. 5(a) corresponds to a non-edge image, FIG. 5(b) to a diagonal edge image, and FIG. 5(c) to a vertical edge image.

As mentioned above, the two-dimensional DCT used in the present embodiment has a matrix size of 4×4 pixels, and thus, when providing hardware to perform DCT, circuit scale can be reduced in comparison with DCT using a typical matrix size of 8×8. Further, the quantity of data to be processed is smaller, which contributes to shortening of computing time.

Figure 6A:
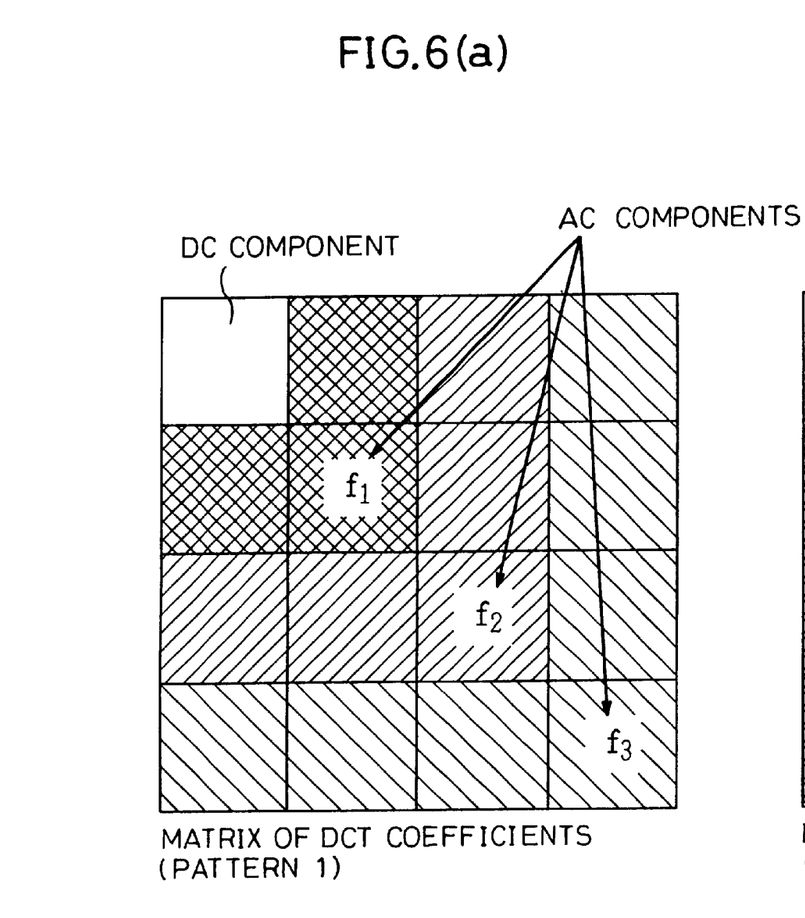
FIGS. 6(a) and 6(b) are explanatory drawings showing division into three domains of matrices of frequency-converted coefficients.
Figure 6B:
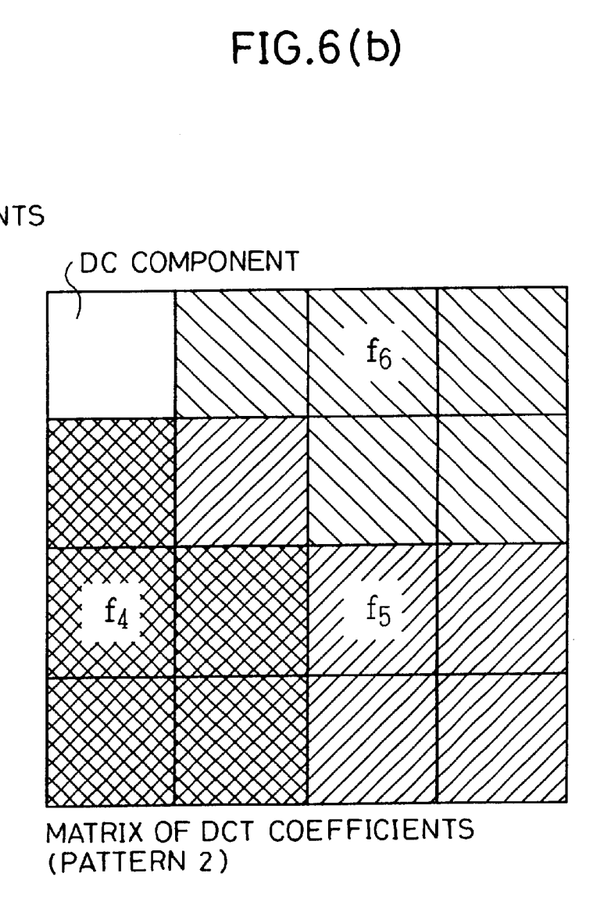

The coefficient computing means 3 perform the following operations. First, the matrix of frequency conversion coefficients corresponding to each partial image is divided into, as shown in FIG. 6(a), three domains from low frequency to high frequency, and, as shown in FIG. 6(b), into three wedge-shaped domains of 300 each, radiating from the upper left-hand corner of the matrix. Then, in each of these six domains, by calculating the sum of the absolute values of the coefficients and dividing by the number of coefficients in that domain, a mean coefficient value is calculated for each domain. Specifically, mean coefficient values for the six domains f1 through f6 shown in FIGS. 6(a) and 6(b) are calculated by the following formulae.

$f1=\{|X(1,0)|+|X(0,1)|+|X(1,1)|\}/3$ $f2=\{|X(2,0)|+|X(2,1)|+|X(0,2)|+|X(1,2)|+|X(2,2)|\}/5$ $f3=\{|X(3,0)|+|X(3,1)|+|X(3,2)|+|X(0,3)|+|X(1,3)|+|X(2,3)|+|X(3,3)|\}/7$ $f4=\{|X(0,1)|+|X(0,2)|+|X(1,2)|+|X(0,3)|+|X(1,3)|\}/5$ $f5=\{|X(1,1)|+|X(2,2)|+|X(3,2)|+|X(2,3)|+|X(3,3)|\}/5$ $f6=\{|X(1,0)|+|X(2,0)|+|X(3,0)|+|X(2,1)|+|X(3,1)|\}/5$

As shown above, the coefficients of each domain are converted to absolute values before finding a mean value of the coefficients of each domain. In this way, when the sum of the coefficients of each domain is calculated, mutual cancelling out of coefficients of positive and negative value, and the resulting effacement of the features of the coefficients, can be avoided. Further, by dividing the matrix of frequency-converted coefficients into six domains using the two foregoing patterns, if there is an edge within the partial image, the type of edge can be detected (vertical edge, horizontal edge, or another type of edge). Incidentally, the mean coefficient values for each of the domains f1 through f6 of the partial images corresponding to a non-edge image, a diagonal edge image, and a vertical edge image are shown below the respective matrices of frequency-converted coefficients in FIGS. 5(a) through 5(c).

Data of the mean coefficient values calculated as above are sent to the conversion filter selecting means 4.

Figure 7:
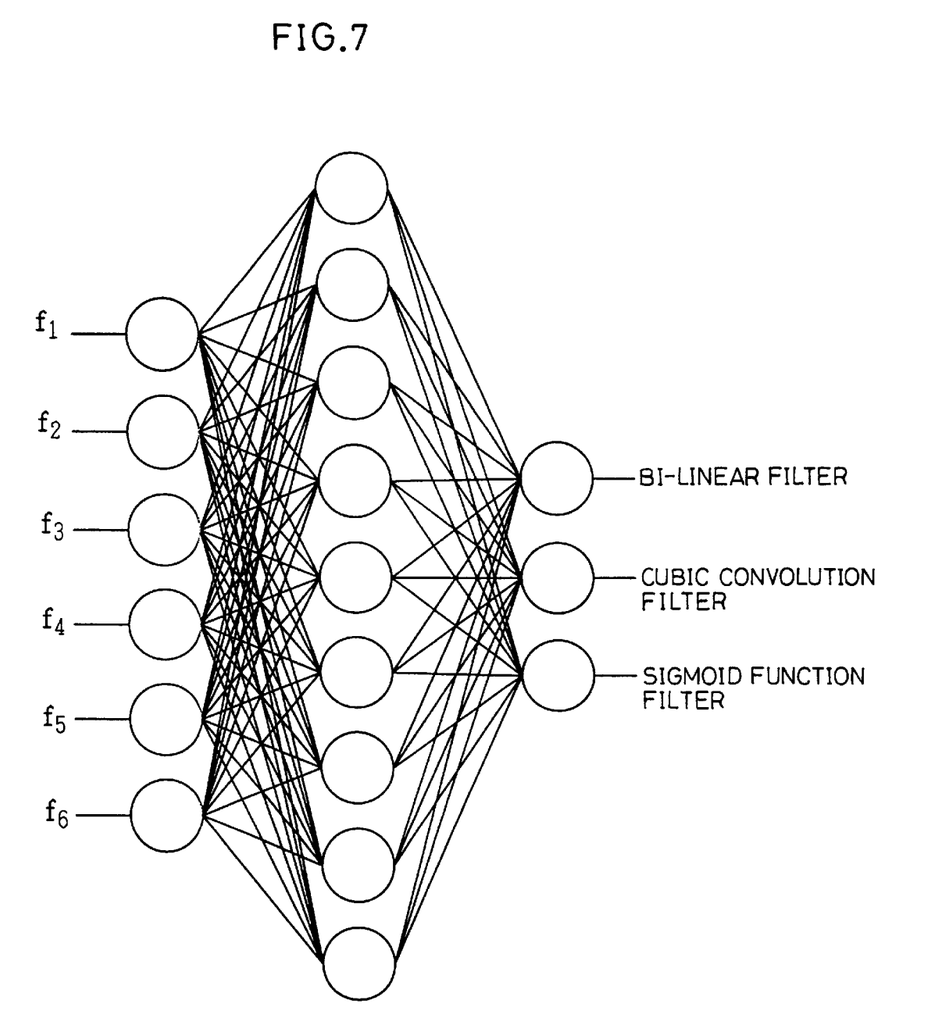
FIG. 7 is a schematic drawing showing the structure of a hierarchical neural network used in an embodiment of the present invention.

In the conversion filter selecting means 4, data of the six mean coefficient values received from the coefficient computing means 3 are inputted into a hierarchical neural network with 6 inputs and 3 outputs, like that shown in FIG. 7. The hierarchical neural network has previously learned, from experiments, to select filters most suited to edge areas, non-edge areas, etc. Data of one mean coefficient value is inputted into each input unit, and then, through 9 mid-tier units, due to mutual effects among the units, the suitability of each filter to the partial image having the inputted mean coefficient values is outputted. The actual formulae used in computation in each unit are as follows.

$$H_j = f\left(\sum_{i=1}^{6} x_i \cdot w_{ij} + \theta_j\right)$$

$$O_k = f\left(\sum_{j=1}^{9} H_j \cdot V_{jk} + \gamma_k\right)$$

Here, f(X) is a sigmoid function, shown by f(X)=1/(1+ exp(−X)). Further, x is an input value inputted into the input tier, H is a value outputted by a unit of the mid-tier, and O is a value outputted by a unit of the output tier. Again, w and v are values of the weight of the connections between the input and mid-tiers and between the mid- and output tiers, respectively, and θ and γ are offset values of the mid-tier and the output tier, respectively. Incidentally, $i$ in the equation may be an integer from 1 to 6, inclusive; $j$ may be an integer from 1 to 9, inclusive; and $k$ may be an integer from 1 to 3, inclusive.

Based on the outputted results of the hierarchical neural network, when the value outputted by the first output unit is greatest, a filter which uses bi-linear interpolation is selected; when the value outputted by the second output unit is greatest, a filter which uses cubic convolution interpolation is selected; and when the value outputted by the third output unit is greatest, a filter which uses a sigmoid function is selected. The result of this selection is then sent to the interpolation processing means 5.

As discussed above, a hierarchical neural network is used as means for calculating the suitability of each filter from the six mean coefficient values. Accordingly, processing time can be shortened in comparison with, for example, calculation of suitability using logic computing, etc. Further, although the hierarchical neural network in the present embodiment has 6 inputs and 3 outputs, the advantage of this type of hierarchical neural network is increased when there are more inputs and outputs.

Using the filter selected by the conversion filter selecting means 4, the interpolation processing means 5 perform interpolation processing of the partial image data, extracted by the partial image extracting means 1 and temporarily stored in the buffer, so as to perform resolution conversion to 2 times the initial resolution.

When the conversion filter selecting means 4 have selected the filter which uses bi-linear interpolation, the interpolation processing means 5 perform interpolation processing using bi-linear interpolation. Actual computation is performed by means of the following formula.

$$p(u, v) = \{(i+1)-u\} \{(j+1)-v\} P_{ij} + \{(i+1)-u\} (v-j) P_{i(j+1)} + (u-i) \{(j+1)-v\} P_{(i+1)j} + (u-i)(v-j) P_{(i+1)(j+1)}$$

i=[u], j=[v] (Here, [ ] is Gauss's notation: only the integer portion of the number is used.)

Figure 8A:
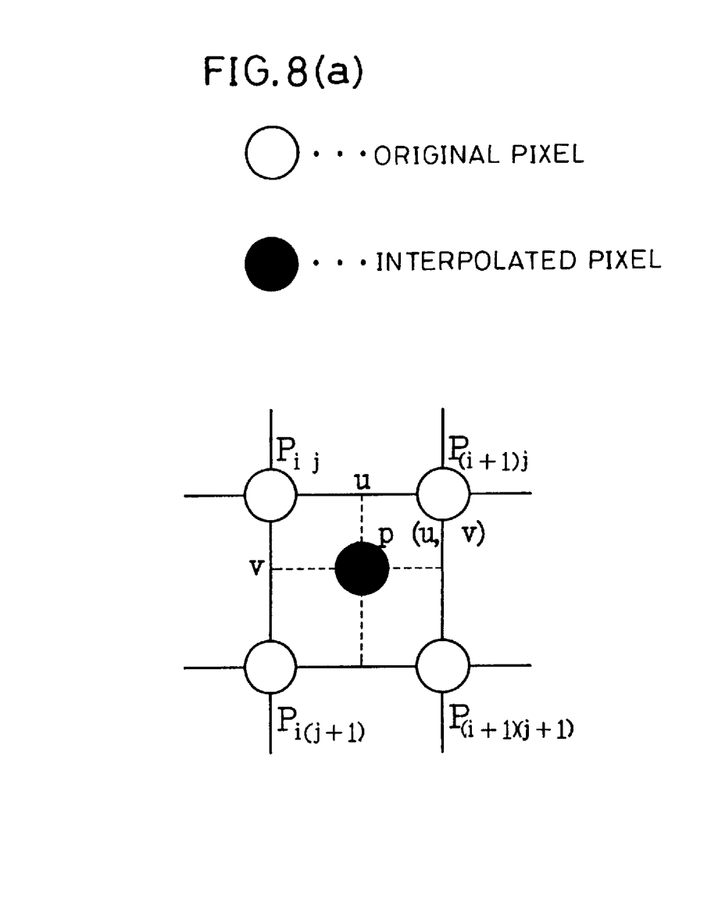
FIGS. 8(a) and 8(b) are explanatory drawings showing relationships between positions of original pixels of a partial image and positions of interpolated pixels.

Here, u,v are coordinate values of an interpolated pixel, and P is the pixel value of an original pixel. The positional relationship between original pixels and interpolated pixels in the foregoing computation is shown in FIG. 8(a). When using the foregoing formula to perform resolution conversion to 2 times the initial resolution, interpolated pixels p(u,v) are p(i+0.5,j), p(i,j+0.5), and p(i+0.5,j+0.5).

Figure 9A:
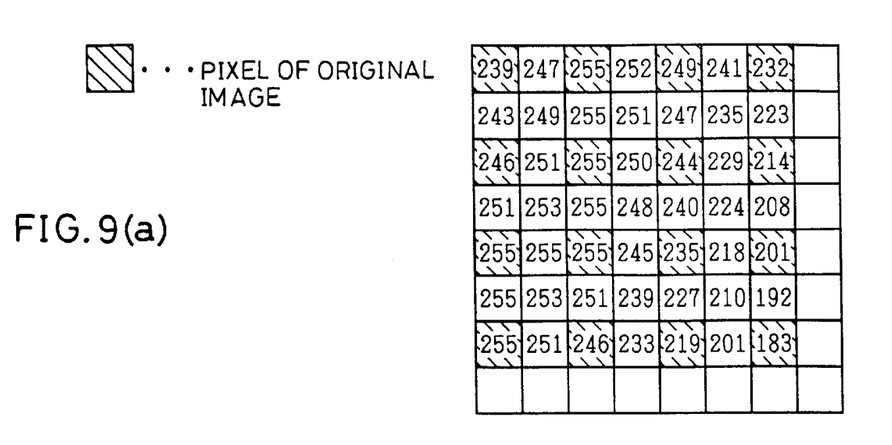
FIGS. 9(a) through 9(c) are explanatory drawings showing the results of interpolation processing of three partial images.

By means of the foregoing calculations, a non-edge image like that shown in FIG. 2(a) is converted to an image like that shown in FIG. 9(a), which has undergone resolution conversion to 2 times the initial resolution.

When, on the other hand, the conversion filter selecting means 4 have selected the filter which uses cubic convolution interpolation, the interpolation processing means 5 perform interpolation processing using cubic convolution interpolation. Actual computation is performed by means of the formula.

$$p(u,v) = [f(y_1) f(y_2) f(y_3) f(y_4)] \begin{bmatrix} P_{11} & P_{21} & P_{31} & P_{41} \\ P_{12} & P_{22} & P_{32} & P_{42} \\ P_{13} & P_{23} & P_{33} & P_{43} \\ P_{14} & P_{24} & P_{34} & P_{44} \end{bmatrix} \begin{bmatrix} f(x_1) \\ f(x_2) \\ f(x_3) \\ f(x_4) \end{bmatrix}$$

$$f(t) = (\sin(\pi t))/(\pi t)$$

$$\begin{array}{llllll}
x_1 & = & 1+(u-[u]) & y_1 & = & 1+(v-[v]) \\
x_2 & = & (u-[u]) & y_2 & = & (v-[v]) \\
x_3 & = & 1-(u-[u]) & y_3 & = & 1-(v-[v]) \\
x_4 & = & 2-(u-[u]) & y_4 & = & 2-(v-[v])
\end{array}$$

Figure 8B:
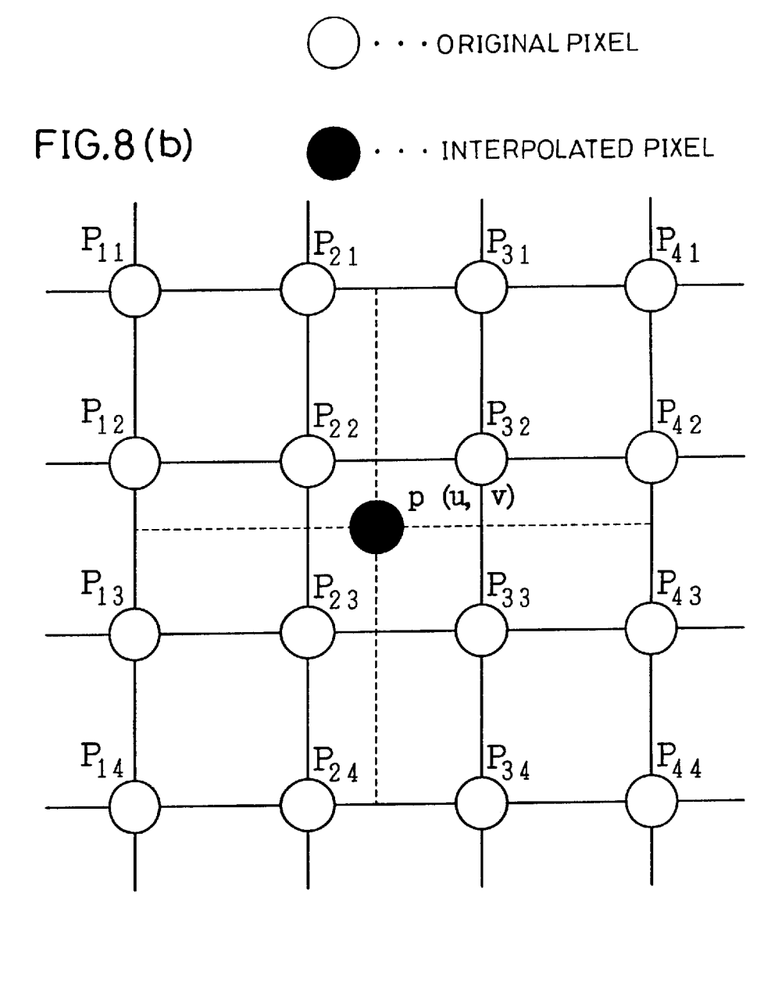

The positional relationship between original pixels and interpolated pixels in the foregoing computation is shown in FIG. 8(b). When using the foregoing formula to perform resolution conversion to 2 times the initial resolution, interpolated pixels p(u,v) are, as in the case of bi-linear interpolation, p(i+0.5,j), p(i,j+0.5), and p(i+0.5,j+0.5).

Figure 9B:
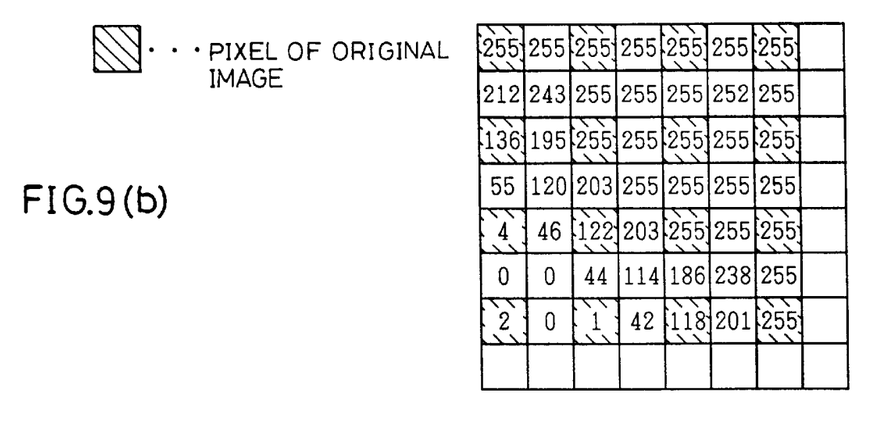

By means of the foregoing calculations, a diagonal edge image like that shown in FIG. 2(b) is converted to an image like that shown in FIG. 9(b), which has undergone resolution conversion to 2 times the initial resolution.

Further, when the conversion filter selecting means 4 have selected the filter which uses a sigmoid function, the interpolation processing means 5 perform interpolation processing using a sigmoid function. Actual computation is performed by means of the following formulae.

$$t1 = 1/(1+\exp(-25 \cdot O_3((i+1)-u-0.5)))$$

$$t2 = 1/(1+\exp(-25 \cdot O_3((j+1)-v-0.5)))$$

$$t3 = 1/(1+\exp(-25 \cdot O_3(u-i-0.5)))$$

$$t4 = 1/(1+\exp(-25 \cdot O_3(v-j-0.5)))$$

$$p(u,v) = t1 \cdot t2 \cdot P_{ij} + t1 \cdot t4 \cdot P_{i(j+1)} + t3 \cdot t2 \cdot P_{(i+1)j} + t3 \cdot t4 \cdot P_{(i+1)(j+1)}$$

i=[u], j=[v] (Here, [ ] is Gauss's notation: only the integer portion of the number is used.)

As in bi-linear interpolation, u,v are coordinate values of an interpolated pixel, and P is the pixel value of an original pixel. The positional relationship between original pixels and interpolated pixels in the foregoing computation is shown in FIG. 8(a). When using the foregoing formulae to perform resolution conversion to 2 times the initial resolution, interpolated pixels p(u,v) are p(i+0.5,j), p(i,j+0.5), and p(i+0.5,j+0.5).

Figure 9C:
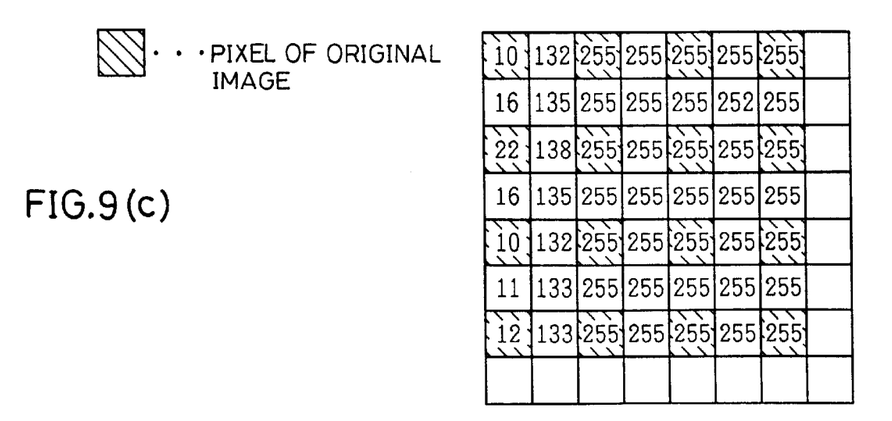

By means of the foregoing calculations, a vertical edge image like that shown in FIG. 2(c) is converted to an image like that shown in FIG. 9(c), which has undergone resolution conversion to 2 times the initial resolution.

In the formulae above, $O_3$ is the value outputted by the third output unit of the foregoing hierarchical neural network. In other words, $O_3$ shows the suitability for the partial image in question of the filter which uses the sigmoid function. In this way, the incline of the sigmoid function in the vicinity of the threshold value can be changed according to the suitability of the filter which uses the sigmoid function. When suitability is high, the incline of the sigmoid function in the vicinity of the threshold value is increased, and when the partial image includes an edge area, interpolation processing can be performed so as to preserve the edge. On the other hand, when suitability is low, the incline of the sigmoid function in the vicinity of the threshold value is decreased, and smoother interpolation processing can be performed. Accordingly, it is possible to perform interpolation processing which is well-adapted to the features of the partial image.

Incidentally, the filter which uses the sigmoid function is selected not only with vertical edge images, but also with, for example, horizontal edge images.

Image data which has been interpolation processed as above is stored in a memory, etc., and is used, as needed, as a high-resolution converted image or as an enlarged image.

Incidentally, in the foregoing example, frequency conversion was by means of DCT, but there is no particular limitation to DCT, and, for example, Fourier transform or wavelet transform may be used. Further, in the foregoing example, the base size used for DCT was 4×4, but there is no particular limitation to the size used, and it is also possible to perform processing using a size of, for example, 8×8. Further, the filters used in the foregoing example were filters using bi-linear interpolation, cubic convolution interpolation, and a sigmoid function, but there is no particular limitation to these filters, and other filters may be used, provided that a filter capable of smooth interpolation and a filter able to preserve or emphasize edges are used.

By means of the structure explained above, the image processing device according to the present embodiment is able to perform interpolation of gray-scale images which contain both images with many edge areas, such as text images, and images with may non-edge images, such as photographic images, such that in edge areas, edges are preserved, and in smooth areas which are non-edge areas, smoothness is maintained. Consequently, high-resolution converted images can be provided with little impairment of image quality.

In the image processing device according to the present invention, the conversion filter selecting means may be structured so as to include a hierarchical neural network, which receives as input feature quantities of a partial image and outputs the suitability of each type of filter to the partial image in question, and so as to select the conversion filter on the basis of the foregoing suitability.

If the suitability of each filter for a partial image is calculated from the feature quantities of that partial image using, for example, logic computing, there are a huge number of calculations to perform when there is a large number of feature quantities, and processing time is increased. However, with the foregoing structure, since the suitability of each filter is calculated using a hierarchical neural network which has previously learned from experimental data, computing can be performed in a short processing time, even with a large number of feature quantities. Accordingly, a fairly large number of feature quantities can be used, which has the effect that a conversion filter suited to each partial image can be selected more appropriately.

In the image processing device according to the present invention, the feature quantity extracting means may be structured so as to divide into a plurality of domains, using a plurality of patterns, a matrix equal in size to the partial image, made up of frequency-converted coefficients obtained from the frequency conversion means, and so as to calculate a mean value of the frequency-converted coefficients of each domain as the feature quantity for that domain.

In the foregoing structure, the feature quantity extracting means divide into a plurality of domains, using a plurality of patterns, the matrix made up of frequency-converted coefficients, and calculate a mean value of the frequency-converted coefficients of each domain as the feature quantity for that domain. Consequently, an effect of this structure is that, when a partial image includes an edge, feature quantities can be calculated which appropriately show the features of that partial image, regardless of the orientation of the edge.

In the image processing device according to the present invention, the feature quantity extracting means may be structured so as to calculate a mean value of absolute values of the frequency-converted coefficients of each domain as the feature quantity for that domain.

Since frequency-converted coefficients can generally be positive or negative, if the mean value of the coefficients of a domain is calculated using the values as they are, positive and negative values cancel each other out, and the features are effaced. However, with the foregoing structure, since a mean value of the absolute values of the frequency-converted coefficients is used as a feature quantity, the features of each domain can be reflected with certainty. Consequently, an effect of this structure is that feature quantities can be calculated which appropriately show the features of each partial image.

In the image processing device according to the present invention, the feature quantity extracting means may be structured so as to use, as the patterns for dividing into a plurality of domains the matrix of frequency-converted coefficients, a pattern which divides the matrix into a plurality of domains from low frequency to high frequency, and a pattern which divides the matrix into a plurality of wedge-shaped domains of a fixed number of degrees each, radiating from the upper left-hand corner of the matrix.

With the foregoing structure, since the matrix of frequency-converted coefficients is divided into a plurality of domains using a pattern which divides the matrix into a plurality of domains from low frequency to high frequency, and using a pattern which divides the matrix into a plurality of wedge-shaped domains of a fixed number of degrees each, radiating from the upper left-hand corner of the matrix, if there is an edge within the partial image, the type of edge can be determined (vertical edge, horizontal edge, or another type of edge). Consequently, an effect of this structure is that feature quantities can be calculated which more suitably show the features of each partial image.

In the image processing device according to the present invention, the frequency conversion means may be structured so as to perform frequency conversion by means of discrete cosine transform using a matrix size of 4×4.

With the foregoing structure, since frequency conversion is by means of discrete cosine transform using a matrix size of 4×4, when designing the device to embody this structure, circuit scale and the quantity of processing can be reduced in comparison with DCT using a typical matrix size of 8×8. Consequently, effects of this structure are to enable reduction of the size and cost of the device, and to shorten computing time.

In the image processing device according to the present invention, when a filter using a sigmoid function is used as a conversion filter, the filter using a sigmoid function may be structured such that the sigmoid function is as shown by the formula $1/(1+\exp(-Wg(x-0.5)))$, where position coordinates of a pixel to be interpolated are shown by x, and such that, when the conversion filter selecting means select the filter using the sigmoid function, the value of Wg in the foregoing formula increases proportionally with the suitability of the filter using the sigmoid function.

With the foregoing structure, when the conversion filter selecting means select the filter using the sigmoid function, the value of Wg in the foregoing formula increases proportionally with the suitability of the filter using the sigmoid function. Accordingly, according to the suitability of the filter using the sigmoid function, interpolation processing can be performed which is optimum for the suitability. For example, when suitability is high, the incline of the sigmoid function is increased in the vicinity of the threshold value, and interpolation processing is performed which preserves edges; when suitability is low, the incline of the sigmoid function in the vicinity of the threshold value is decreased, and smooth interpolation processing is performed. Consequently, an effect of this structure is to enable finer control of interpolation processing in accordance with the features of the partial image, thus enabling natural high-resolution-converted images with little image quality deterioration.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. An image processing device which divides into partial images a gray-scale image to be processed, and performs high resolution conversion or enlargement processing of the partial images, comprising:

frequency conversion means, which perform frequency conversion processing of the partial image, wherein said frequency conversion means converts frequency by a discrete cosine transform;

feature quantity extracting means, which, based on output from said frequency conversion means, extract feature quantities from the partial image; and conversion filter selecting means, which based on output from said feature quantity extracting means, select one of a plurality of conversion filters for performing the high resolution conversion or enlargement processing of the partial image.

2. The image processing device set forth in claim 1, wherein:

said conversion filter selecting means include a hierarchical neural network, which receives the feature quantities as input and outputs suitability of each said conversion filter for the partial image; and said conversion filter selecting means select one of said conversion filters on the basis of the suitability.

3. The image processing device set forth in claim 1, wherein:

said feature quantity extracting means divide into a plurality of domains, using a plurality of patterns, a matrix equal in size to the partial image, made up of frequency-converted coefficients obtained from said frequency conversion means, and calculate a mean value of the frequency-converted coefficients of each domain as the feature quantity for that domain.

4. The image processing device set forth in claim 3, wherein:

said feature quantity extracting means calculate a mean value of absolute values of the frequency-converted coefficients of each domain as the feature quantity for that domain.

5. The image processing device set forth in claim 3, wherein:

said feature quantity extracting means use, as the patterns for dividing into a plurality of domains the matrix of frequency-converted coefficients, a pattern which divides the matrix into a plurality of domains from low frequency to high frequency, and a pattern which divides the matrix into a plurality of wedge-shaped domains of a fixed number of degrees each, radiating from an upper left-hand corner of the matrix.

6. The image processing device set forth in claim 1, wherein:

said discrete cosine transform a matrix size of 4×4.

7. The image processing device set forth in claim 2, wherein:

when a filter using a sigmoid function is used as one of said conversion filters, the sigmoid function is as shown by the formula $1/(1+\exp(-W_g(x-0.5)))$, where position coordinates of a pixel to be interpolated are shown by x; and when said conversion filter selecting means select said filter using the sigmoid function, a value of Wg in the foregoing formula increases proportionally with the suitability of said filter using the sigmoid function.

8. The image processing device set forth in claim 1, wherein:

as said conversion filters, a filter using cubic convolution interpolation, a filter using bi-linear interpolation, and a filter using a sigmoid function are used.

9. The image processing device set forth in claim 1, further comprising:

partial image extracting means which read partial images;

wherein said partial image extracting means perform reading of partial images such that adjacent partial images partially overlap.

10. The image processing device set forth in claim 1, wherein:

the gray-scale image is a mixed image including a text image and a photographic image.

11. The image processing device set forth in claim 2, wherein said hierarchical neural network includes:

input units equal in number to a number of feature quantities to be inputted; and output units equal in number to a number of said conversion filters.

12. The image processing device set forth in claim 2, wherein:

said hierarchical neural network is a Perceptron.

13. The image processing device set forth in claim 5, wherein:

the fixed number of degrees is 30°.

14. The image processing device set forth in claim 6, wherein:

in a conversion formula used in the discrete cosine transform, computation results of $\cos\{(2m+1)u\pi/8\}$ and $\cos\{(2n+1)v\pi/8\}$ are calculated in advance and formed into a 4×4 matrix.

* * * * *